No. 759,699. PATENTED MAY 10, 1904.
W. D. GRAVES.
WHEEL OILER.
APPLICATION FILED OCT. 13, 1903.
NO MODEL.
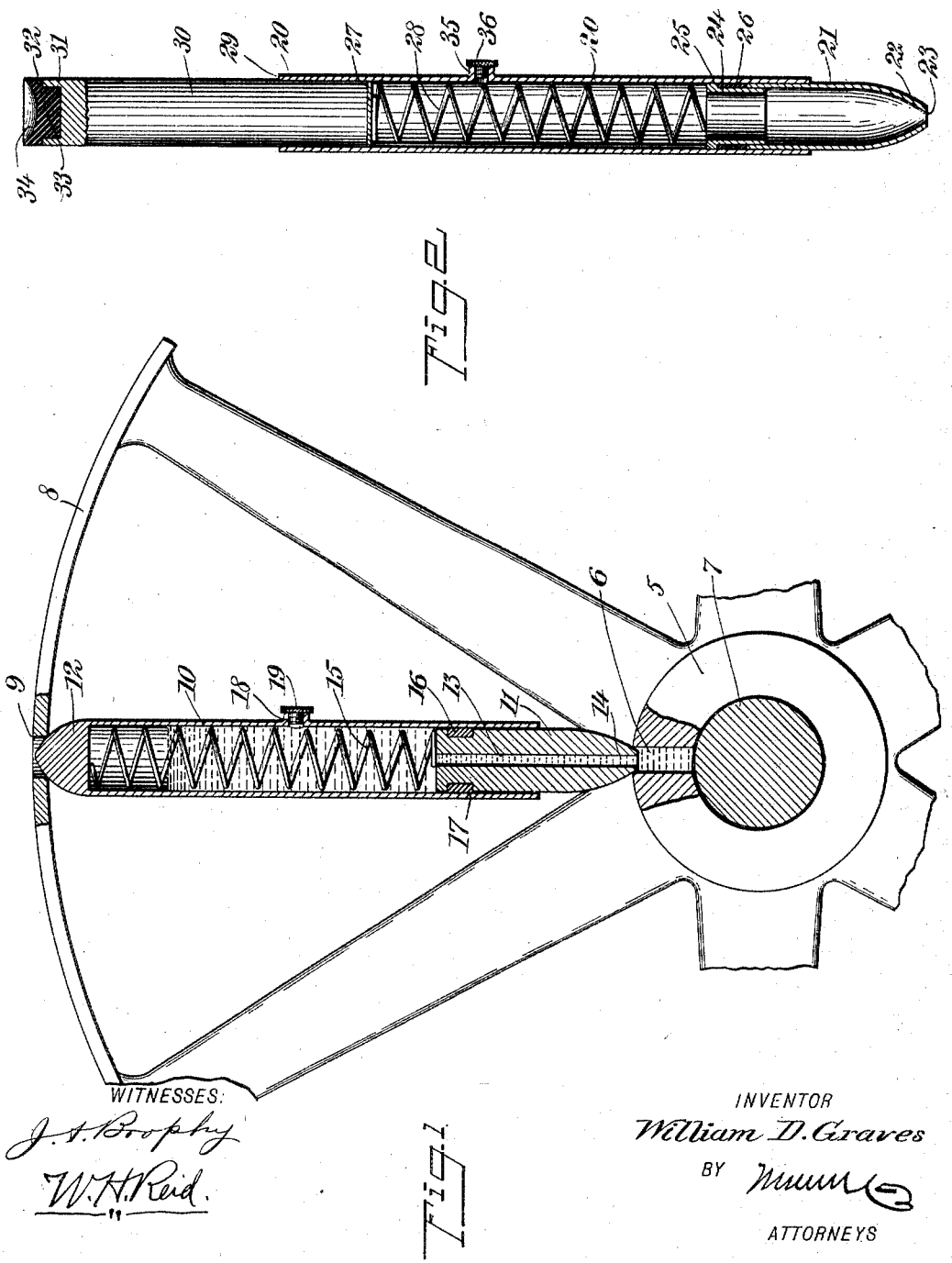
INVENTOR
William D. Graves No. 759,699.                                                                    Patented May 10, 1904.

UNITED STATES PATENT OFFICE.

WILLIAM D. GRAVES, OF BROWN VALLEY, MINNESOTA.

WHEEL-OILER.

SPECIFICATION forming part of Letters Patent No. 759,699, dated May 10, 1904.

Application filed October 13, 1903. Serial No. 176,876. (No model.)

*To all whom it may concern:*

Be it known that I, WILLIAM D. GRAVES, a citizen of the United States, and a resident of Brown Valley, in the county of Traverse and State of Minnesota, have invented a new and Improved Wheel-Oiler, of which the following is a full, clear, and exact description.

This invention relates to an oiler to be applied to a loose pulley or any form of a wheel revolving on a stationary shaft.

The purpose of the present invention is to provide a suitable oil-receptacle that can be readily attached to a pulley or other wheel revoluble on a shaft between the portion of the hub containing the oil-passage and the opposite inner face of the rim of the wheel.

A further object of the invention is to provide such a device that will automatically secure itself between the hub at its oil-passage and the radially-opposite apertured portion of the hub and which can readily be detached for the purpose of refilling and then returned to its position on the wheel.

My invention comprises the novel features of construction and arrangement, as hereinafter set forth and then particularly pointed out in the claims.

Reference is to be had to the accompanying drawings, representing a device embodying my invention, in which similar characters of reference indicate corresponding parts in both views.

Figure 1 shows in cross-section a device embodying my invention as in place upon a loose pulley, and Fig. 2 is a sectional view of a modified form of my invention.

Referring now to Fig. 1, the hub 5 of the pulley has the usual oil-passage 6, leading to the shaft 7, and the rim 8 of the pulley has the customary aperture 9, located radially opposite the oil-passage 6. If such aperture is not provided in the pulley, it may be readily drilled therein.

The device consists, essentially, of two telescoping members 10 and 11, each of which has its free end somewhat tapered in order to slightly enter the oil-passage and the aperture in the rim. The member 10 comprises a tube having a pointed extremity 12, arranged to extend a short distance into the aperture 9.

The member 11 is made of an external diameter to snugly slide inside the tube 10 and has an axial bore 13. The extremity 14 of the member 11 is tapered to the end of the bore and is arranged to project a very short distance into the oil-passage 6. In order to cause a movement tending to separate the members 10 and 11, I interpose a coil-spring 15 between the end 12 of the member 10 and the inner end of the member 11, which, it will be readily seen, will force the members apart until the tapered extremities snugly fit into the said sockets 6 and 9. If desired, a suitable packing-ring 16 may be placed in an annular groove 17 in the end portion of the member 11 for the purpose of preventing leakage of the lubricant.

In order to fill the device with lubricant before applying it, the members 10 and 11 are separated, and the tube 10 is inverted with its open end upward and then partially filled with oil. Thereupon the member 11 is inserted a short distance, and the device is placed on the pulley by first inserting the end 14 in the oil-passage of the hub and then compressing the members until the member 12 may pass under the rim to a position opposite the aperture 9, when the end 12 is placed in said aperture, where it will be retained by the spring 15.

It will be obvious that to refill the device it can be easily removed by simply moving the two members together until the end 9 is disengaged from the rim.

If preferred, an aperture 18 may be made in the wall of the tube 10 and closed by a suitable screw-plug 19. When the supply of oil becomes exhausted, the pulley is moved until the device is in a substantially horizontal position with the plug uppermost, and then the plug is removed, the device filled with the lubricant, and the plug is returned to its socket.

In Fig. 2 I have shown a slight modification, in which there are two telescoping tubular members 20 and 21. The member 21 slides inside the member 20 and has its lower portion 22 tapered to an aperture 23. A collar 24 is secured inside the upper end of the tube 21 and has an annular flange 25 at its upper end, between which flange and the end of the tube 21 is thereby formed an annular channel in which is placed a packing-ring 26. The upper end portion of the tube 20 contains a transverse wall 27, closing the tube at that portion. A coil-spring 28 is arranged in the tube 20, engaging the wall 27 at one end and resting on the flange 25 at its other end, thereby tending to move the members 20 and 21 apart.

In the upper socket portion 29 of the tube 20 is inserted a rod 30, having at its free end a socket portion 31. A block 32, preferably made of soft rubber, has a reduced extension 33 fitting in the said socket 31, the other end of the rubber block having a concave portion 34. The object of this latter construction is to provide means for readily attaching the device to a pulley having no aperture in its rim. The spring 20 will force the hollow face of the rubber block tightly against the rim, where it will be retained by the frictional engagement of the rubber, as well as by a kind of suction effect caused by its hollow face. It will be understood, however, that I do not limit myself to the use of a rubber block having a tenon fitting in a socket, as, if found desirable, I may employ a rubber cap fitted on the rod 30.

The tube 20 may have an apertured portion 35, closed by a plug 36, for the purpose of filling the device with oil.

While I have shown my device as attached to a pulley in the form of a wheel composed of the usual hub and rib connected by spokes, it may be secured to a solid wheel having a hub and flanged rim by providing an aperture in the hub opposite the rim.

Having thus described my invention, I claim as new and desire to secure by Letters Patent—

1. In a wheel-oiler, an oil-containing vessel having an aperture at one end portion, and arranged to be inserted between the hub and rim of a wheel, the vessel having an extensible portion arranged to retain the device with its ends respectively in engagement with the rim and hub.

2. In a wheel-oiler, an oil-containing vessel having an aperture at one end portion, and arranged to be inserted between the hub and rim of a wheel, the vessel being automatically extensible lengthwise, and thereby retained in engagement at its ends with the hub and rim respectively.

3. In a wheel-oiler, an oil-containing vessel comprising two telescoping members adapted to be arranged between the hub and rim of a wheel, one of said members having an aperture extending through its end, and means contained inside said member and arranged to extend the said telescoping members into engagement with the hub and rim of the wheel.

4. In a wheel-oiler, an oil-containing vessel comprising two telescoping members adapted to be arranged between the hub and rim of a wheel, one of said members having an axial bore, means inside of said vessel tending to separate the telescoping members and force them into engagement with the hub and rim of the wheel, one of said members having an aperture in its side, and a screw-plug arranged to close said aperture.

5. In a wheel-oiler, a tube closed at one end and having said end made tapering, a tubular member arranged to slide inside of said tube and having its outer end tapering, and a spring located in the first-mentioned tube and having one end engaging the said end portion of the tube and its other end engaging said second tube, the spring being arranged to move the tubes apart.

6. A wheel-oiler, comprising an adjustable oil-containing vessel adapted to engage the hub and rim of a wheel.

7. A wheel-oiler comprising an oil-containing vessel formed of telescopic and spring-pressed members, adapted to engage the hub and rim of a wheel.

8. A wheel-oiler, comprising an oil vessel formed of telescopic members, one member having an apertured and tapered inner end to enter an opening in the hub of a wheel and the other provided with an abutment for engaging the rim of the wheel.

In testimony whereof I have signed my name to this specification in the presence of two subscribing witnesses.

WILLIAM D. GRAVES.

Witnesses:
   A. I. ENGEBRETSON,
   JOHN H. PETERSON.